Aug. 1, 1933.  J. B. HADAWAY  1,920,383
SHANK PIECE AND METHOD OF MAKING SHOES
Original Filed April 26, 1930  2 Sheets-Sheet 1
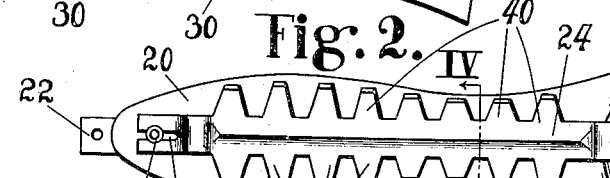
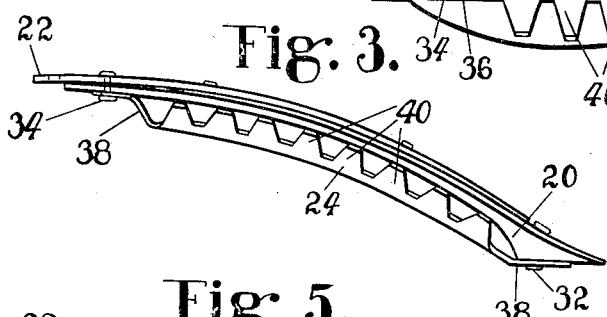
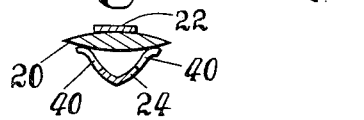
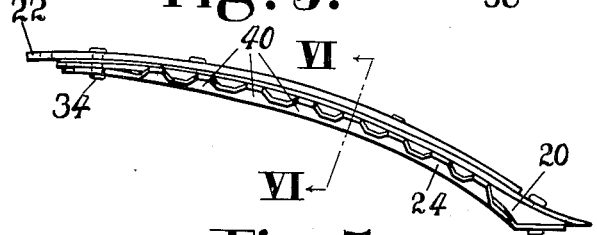
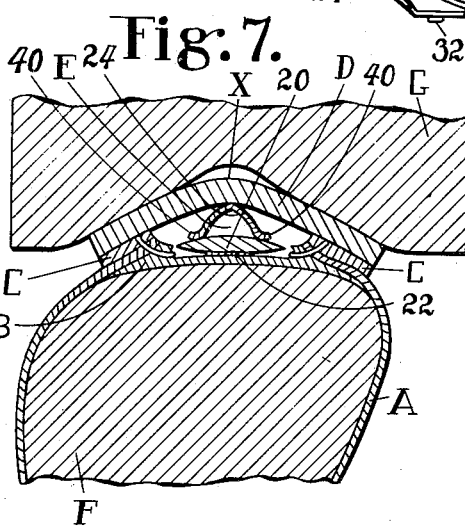
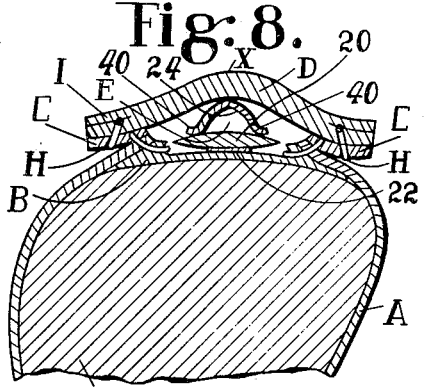
INVENTOR
John B. Hadaway
By his Attorney,
Nelson Howard

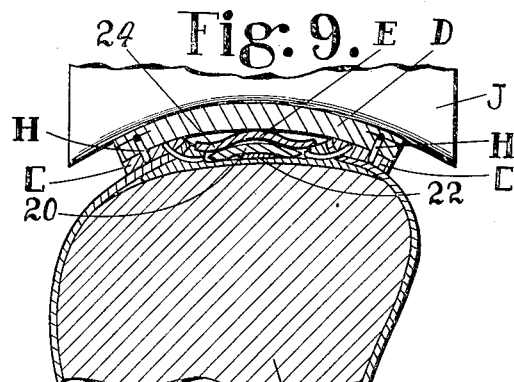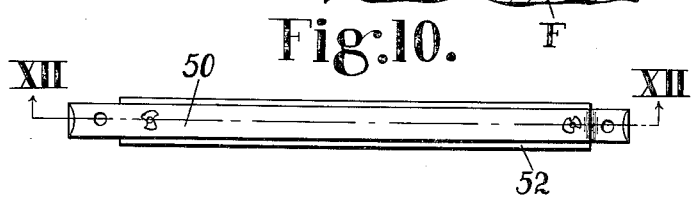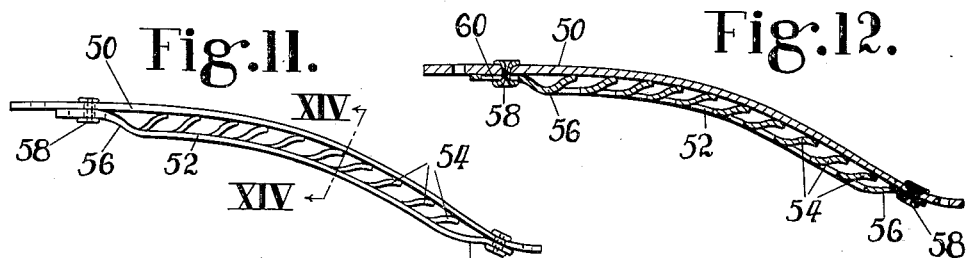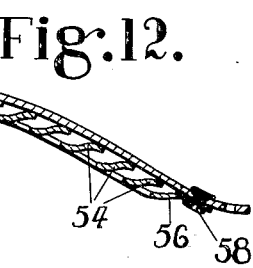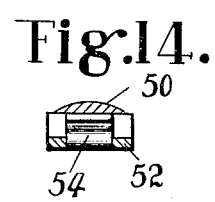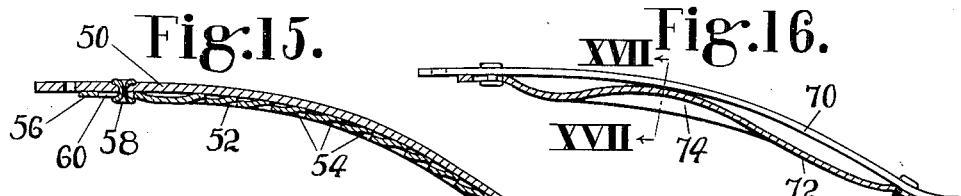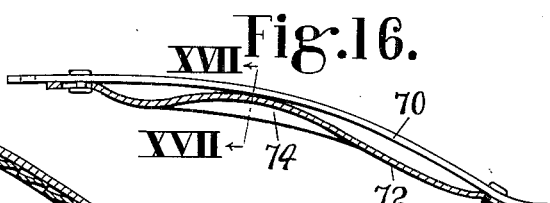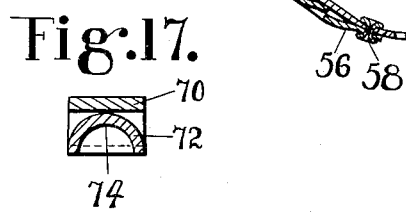

Patented Aug. 1, 1933

1,920,383

UNITED STATES PATENT OFFICE 1,920,383

SHANK PIECE AND METHOD OF MAKING SHOES

John B. Hadaway, Swampscott, Mass., assignor to United Shoe Machinery Corporation, Paterson, N. J., a Corporation of New Jersey Application April 26, 1930, Serial No. 447,664
Renewed September 2, 1932

39 Claims. (Cl. 36—76)

This invention relates to improved methods of shoemaking and to improvements in shoes and shank pieces therefor. The invention is herein illustrated as concerned with a method of producing a so-called close shank in a shoe and as embodied in a shank piece of novel construction adapted to facilitate the production and maintenance of what is known as a close shank and in a shoe having such a shank piece incorporated therein. While herein illustrated with reference to welt shoes, the invention, in certain aspects, may be applicable also to the manufacture of other types of shoes.

In many styles of shoes it is desirable to have the projecting margins of the sole lie close to the upper along the shank portion of the shoe so that the crease between the upper and the sole is substantially closed and a close shank is produced. For various reasons, however, it is difficult to produce and retain permanently this close shank effect. For example, in the manufacture of welt shoes, no matter how closely the welt and outsole may have been laid against the upper in the sole laying operation, when the outsole is subsequently being stitched to the welt along the shank portion of the shoe the outer margins of the welt and sole are necessarily held away from the upper, by the sewing table which enters the welt crease, so that the awl and the needle may enter the welt from the side facing the upper, and consequently when the stitching has been completed the welt remains spaced away from the upper at the shank as well as around the forepart of the shoe. Thereafter the welt is brought into contact with the upper, so as to close the welt crease by imparting increased transverse convexity to the outsole. This shaping of the outsole sets up tensional strain in the outer portion of the outsole and corresponding compressive strains in the inner portion of the outsole or other parts of the shoe bottom. It has often been customary to impart the desired shaping to the outsole by pounding, rubbing or molding operations but the inherent resiliency of the outsole material, due to the strains referred to, tends to cause the outsole ultimately to return to approximately its initial unstrained condition, with the result that the welt is pulled away from the upper, thus opening up the welt crease so that the desired close shank effect is reduced or destroyed and the advantages incident thereto are lost. Moreover, a shoe is necessarily held at such an angle during the outseam stitching along the shank portion of the sole that the stitches extend diagonally through the outsole at an acute angle to the outer face of the projecting sole margin, thus tending to tension the outer portion of the outsole and to resist any attempt to close up the welt crease. When the welt crease is closed by molding or other pressure-applying operations the tension exerted by the stitches is increased and tends to reopen the crease after the pressure on the sole has been relieved. For this and other reasons there has often been no assurance heretofore that a close shank effect or a close fitting sole margin, even if satisfactorily produced in a shoe, would remain therein throughout the life of the shoe.

In view of the foregoing, it is one object of the present invention to secure and permanently to maintain a close fitting sole margin in a shoe.

With this object in view, the present invention provides an improved method of making shoes with close fitting sole margins which, in one aspect, consists in producing and temporarily supporting an abnormal bulge or fullness in a shoe sole and thereafter, by the application of pressure to the sole and to the bulge-supporting means, pressing the sole margins into close fitting relation to the shoe upper and rendering the bulge-supporting means ineffective to support the bulge, at the same time depressing the bulge thereby expanding the sole edgewise to eliminate any tendency of the sole margins subsequently to pull away from the upper.

The depression or flattening out of the bulge in the sole results in widening the sole so that the pressing of the sole margins toward the shoe upper to close the welt crease may be effected without setting up strains in the sole. Thus, the outer surface of the sole is not tensioned, as would be the case if no provision were made for widening the sole as above described, and consequently, after the sole margins have been pressed toward the upper there is no surface tension on the sole tending to pull the sole margins away from the upper. Moreover, the widening of the sole resulting from the flattening out of the bulge therein also results in straightening or repositioning the outseam stitches to such an extent that they become disposed in a more nearly perpendicular relation to the surface of the sole, thus relieving any tension which may previously have been exerted by the stitches tending to displace the sole margins from engagement with the upper. Accordingly, the sole margins are maintained in the desired close fitting relation to the upper throughout the life of the shoe.

As shown, the bulge in the sole is confined to the shank portion of the sole and the non-resilient member hereinbefore referred to as maintaining the bulge in the sole prior to and during the attachment of the sole to the shoe consists of a shank piece of novel construction which is adapted to collapse under heavy pressure and which remains permanently in the shoe and performs the usual functions of a shank piece such as that customarily employed to stiffen and reinforce the shank portion of a shoe. As herein illustrated, in the application of the present method to the manufacture of welt shoes, the shank piece is placed upon the insole of a lasted shoe inside of the sewing rib. The outsole is then laid in place and the bulge in the outsole is produced by the pressure of the sole laying pad, such pressure being insufficient, however, to collapse the shank piece. Thereafter the outsole is stitched to the welt and the sole is leveled in the usual manner, the pressure applied during the leveling operation being sufficient to collapse the shank piece and depress or flatten out the bulge in the outsole as well as to lay the sole margins in close fitting relation to the upper.

Regarded in another aspect, the invention further consists in the provision, for use in the manufacture of shoes, of a shank piece of substantial thickness adapted to afford temporary support for an abnormal upward bulge or fullness in the shank portion of the tread sole of a shoe and comprising a non-resilient member capable of being sufficiently reduced in thickness by the application of pressure to the bulged portion of the sole to permit the elimination of the bulge. While the support for the bulged portion of the sole has just been referred to as a shank piece, it was found convenient to employ that term merely because the support is to be located in the shank portion of a shoe and it is to be understood that the support need not necessarily be a shank piece or shank stiffener of the type customarily employed to stiffen or reinforce the shoe. The illustrated shank piece, however, does have the usual characteristics adapting it to stiffen and reinforce the portion of the shoe in which it is incorporated. Moreover, the illustrated shank piece is of composite construction comprising members initially spaced apart but adapted to be moved into closer relation to each other to effect the collapse of the shank piece. The illustrated shank piece, when incorporated in a welt shoe fills the space between the inner and outer soles inside of the sewing rib and, moreover, the illustrated shank piece is further so constructed that when collapsed it is not only reduced in thickness but it is also widened to such an extent that marginal portions thereof overlap the inseamed portions of the shoe and serve to support them in such a way as positively to assist in permanently maintaining a close edge effect at the shank of the shoe.

The invention will be explained with reference to the accompanying drawings, in which Fig. 1 is a top plan view of a shank piece embodying the invention;

Fig. 2 is a bottom plan view of the shank piece;

Fig. 3 is a view, in side elevation, of the shank piece;

Fig. 4 is a sectional view taken along the line IV—IV of Fig. 2;

Fig. 5 is a sectional view similar to Fig. 3 but showing the shank piece as it appears after being collapsed;

Fig. 6 is a sectional view taken along the line VI—VI of Fig. 5;

Fig. 7 is a cross-sectional view of a welt shoe in the process of manufacture, the shoe having incorporated therein a collapsible shank piece of the type shown in Figs. 1 to 6, and the shank piece being shown in non-collapsed condition;

Fig. 8 is a cross-sectional view of the shoe showing it as it appears after the outsole has been stitched to the welt;

Fig. 9 is a cross-sectional view of the shoe as it appears after the outsole has been leveled and the shank piece has been collapsed by the leveling pressure;

Fig. 10 is a top plan view of an alternative form of shank piece;

Fig. 11 is a side elevational view of the shank piece shown in Fig. 10;

Fig. 12 is a longitudinal sectional view of the shank piece shown in Fig. 10;

Fig. 13 is a bottom plan view of the shank piece shown in Fig. 10;

Fig. 14 is a sectional view taken along the line XIV—XIV of Fig. 11;

Fig. 15 is a view similar to Fig. 12 but showing the shank piece as it appears after being collapsed;

Fig. 16 is a view, partially in elevation and partially in section, showing a still further modified form of shank piece; and Fig. 17 is a section on the line XVII—XVII of Fig. 16.

Referring first to Figs. 7 and 8 of the drawings, the upper materials of a welt shoe are indicated at A, the insole at B, the welt at C, the outsole at D, the shank piece at E, and the last upon which the shoe is made at F. In accordance with the present method as illustrated in Fig. 7, an abnormal upward bulge X is initially formed in the shank portion of the outsole D by means of the shank piece E which, for this purpose, is made of abnormal thickness and of sufficient strength to support the bulge in the sole against the action of any pressure applied to the sole during the manufacture of the shoe up to the time of the sole leveling operation, and more particularly to support the bulge against the pressure applied thereto during the sole laying operation. The strength of the shank piece E, however, is not sufficient to withstand the pressure applied thereto during the sole leveling operation which takes place after the sole has been stitched to the welt, and consequently, as shown in Fig. 9, the shank piece is collapsed by the action of the leveling means and the upward bulge in the sole is depressed. As a result the shank portion of the sole is widened so that the marginal portions thereof are pressed into close engagement with the upper without, however, causing any transverse strains being set up in the sole. Inasmuch, therefore, as the sole is not tensioned or transversely strained there will be no tendency, when the leveling pressure is relieved, for the marginal portions of the sole to pull away from the upper so as to open up the welt crease.

Furthermore, as a result of the widening and transverse bending or molding of the shank portion of the sole during the leveling operation, the portions of the outseam stitches which extend through the outsole become more or less straightened or repositioned to such an extent that they no longer exert any substantial tension tending to open up the welt crease.

Before describing the method in further detail the particular form of shank piece shown in Figs.

7, 8 and 9 will be described. This shank piece, as shown in detail in Figs. 1 to 8, inclusive, of the drawings is of composite construction comprising a filler piece 20, a resilient stiffening strip 22, and an initially expanded, collapsible member 24, each of these parts being arched longitudinally to correspond to the longitudinal arch of the bottom of a last for a shoe in which the shank piece is to be incorporated. The filler piece 20, which may be composed of leather, leatherboard or other suitable material, is molded as shown to provide a desired longitudinally arched and transversely convex formation adapting the body of the filler piece to fit the shank portion of the shoe bottom. The molding operation also provides a flat portion 26 at the forward extremity of the filler piece for engaging the outsole, and a clearly defined ridge 28 between the flat portion 26 and the arched portion of the filler piece. Moreover, the filler piece has a marginal contour adapting it to fit closely between the opposite stretches of the sewing rib along the shank portion of the shoe bottom. The stiffening strip 22 is made of tempered steel to provide adequate resilient support for the longitudinal arch of the shank portion of a shoe. The strip 22 is secured to the insole-facing side of the filler piece 20 by means of tacks 30 (Fig. 1).

The collapsible member 24 of the shank piece consists of a strip of untempered metal one end of which is fixedly secured to the forward portion of the filler piece 20 by means of a rivet or eyelet 32, while the opposite end of the strip is secured to the rear portion of the filler piece by a rivet or eyelet 34, the latter projecting through a slot 36 (Fig. 2) in the member 24. The opposite ends of the member 24 are offset from the curve of the body portion thereof, as shown at 38 in Fig. 3, to enable them to engage the filler piece 20, and assist in maintaining the body of the collapsible member spaced a substantial distance away from the filler piece. To hold the body portion of the collapsible member 24 in spaced relation to the filler piece throughout the sole laying, rounding and stitching operations, the member 24 is further provided with a series of fingers 40 which project from the opposite longitudinal edges of the member. As shown in Fig. 4, the body portion of the collapsible member 24, between the offset ends thereof, is transversely arched and the fingers 40 are curved to correspond to the transverse curve or arch of the filler piece 20 and the stiffening strip 22. The tips of the fingers 40 bear against the filler piece and each finger tip is curved backwardly to facilitate sliding outwardly over the surface of the filler piece during the collapse or flattening out of the member 24. The fingers 40 are of different lengths and are so arranged that the tip of each finger engages the filler piece at the same distance from the adjacent edge thereof, thus insuring that, upon collapse of the shank piece, each finger 40 will project to the same extent beyond the edge of the filler piece to overlie and support the inseamed portions of the shoe bottom.

In using the above-described shank piece E in the manufacture of welt shoes the shank piece, in its non-collapsed condition, is laid upon the insole between the portions of the inseam at the opposite sides of the shoe after the upper materials and the welt have been inseamed to the insole. The outsole D is then laid by means of the yielding sole laying pad G (Fig. 7), after which the outsole is secured to the welt by the outseam stitches H, as indicated in Fig. 8. Up to this stage in the manufacture of the shoe the shank piece E functions to hold the shank portion of the outsole in the transversely arched condition indicated in Fig. 7, with the middle portion of the sole spaced abnormally from the insole, the collapsible member 24 of the shank piece being stiff enough to withstand the pressure of the sole laying pad G without being collapsed or flattened out thereby. However, when the shoe sole is acted upon by the leveling roll J the pressure applied by that roll is sufficient to collapse the shank piece and depress or flatten the transverse bulge in the sole.

Before the sole is leveled, the outseam stitches H slant inwardly from the upper or exposed surface of the welt to the stitch-receiving groove I in the outsole, as shown in Fig. 8. In other words the stitches H extend diagonally through the outsole at an acute angle to the outer face of the projecting sole margin as shown in Fig. 8, such a disposition of the stitches being usually along the shank portions of welt shoes. Moreover, as also shown in Fig. 7, the outer margins of the welt and outsole are initially spaced a substantial distance away from the adjacent portion of the upper, and the tension of the outsole stitches tends to resist any attempt to close the gap between the welt and the upper. When the outsole is subsequently leveled, however, the pressure applied by the leveling roll J not only flattens and widens the sole and presses the sole margins closely against the upper but it also substantially increases the distance between the portions of the outseam stitches which lie in the channel or groove in the outsole with the result that the stitches thereafter extend through the sole and welt more nearly at right angles to the surface of the sole. After being thus straightened the stitches no longer exert tension such as would tend to pull the margins of the outsole and welt away from the upper.

It will also appear, from an examination of Fig. 9, that the flattening out of the collapsible member 24 of the shank piece has widened that member to such an extent that the fingers 40, instead of lying entirely within the space between the inseamed portions of the shoe, now engage and overlap these inseamed portions in such a manner as to press them against the last while the latter remains within the shoe and thereafter to provide a firm and permanent support for the inseamed materials at opposite sides of the shank portion of the shoe bottom.

In the embodiment of the invention illustrated in Figs. 10 to 15, inclusive, of the drawings, there is shown a collapsible shank stiffener composed of two members 50 and 52. The member 50 consists of merely an elongated metallic strip having the usual longitudinal curvature for conforming to the longitudinal arch of the shoe in which it is to be incorporated. The member 52 consists of a metallic strip comprising a body portion curved lengthwise to correspond to the lengthwise curvature of the strip 50 and having a plurality of fingers 54 struck up therefrom in spaced apart relation lengthwise of the strip for holding the body portion of the strip 52 spaced a substantial distance away from the strip 50. The opposite end portions of the strip 52 are offset in the direction toward which the fingers 54 extend, thus providing end portions 56 which are secured by means of rivets 58 to the strip 50. As shown, one of the rivets 58 extends through an elongated slot 60 in the strip 52 arranged to permit longitudinal lengthwise movement of the strip 52 relatively to the strip 50 as the strip 52 lengthens under pressure resulting in the collapse of the stiffener. Each of the fingers 54 is inclined in the same direction relatively to the strip 50 to facilitate the flattening out of the member 52 as the shank piece is being collapsed under the action of the leveling roll. The direction of inclination of the fingers 54 is such as to facilitate the collapse of the stiffener during the beginning of the leveling operation upon the shank portion of the sole, it being customary for the leveling roll to move first along the shank in the general direction of the inclination of the fingers.

In Figs. 16 and 17 the invention is shown as embodied in a further modified form comprising an elongated longitudinally arched stiffener strip 70 and a collapsible member 72 which is riveted at its ends to the strip 70 in the same manner as that heretofore described in connection with the shank piece shown in Figs. 10 to 15. The collapsible member 72, however, instead of being provided with offset fingers for maintaining it spaced away from the stiffener strip, has its middle portion transversely arched, as indicated at 74, to engage the middle portion of the strip 70 and initially to hold the greater part of the member 72 away from the strip 70. The construction is such, however, that while the member 72 will withstand the pressure of the sole laying pad it will not withstand the pressure of the leveling roll but will be flattened out against the strip 70 by the sole leveling pressure.

Having described my invention, what I claim as new and desire to secure by Letters Patent of the United States is:

1. That improvement in methods of making shoes with close fitting sole margins which consists in maintaining, prior to and during the attachment of a sole to a shoe, an abnormal outward bulge in the sole by utilizing at the inner side of the sole a non-resilient member adapated to retain its shape under a limited amount of pressure but capable of being materially reduced in thickness by the application of a greater amount of pressure and, after the sole has been attached to the shoe, widening the sole by depressing said bulge and thus eliminating any tendency of the sole margins to pull away from the upper of the shoe.

2. That improvement in methods of making shoes having close shanks which consists in positioning beneath the tread sole of a shoe a shank member adapted to retain its shape under a limited amount of pressure but capable of being materially reduced in thickness by a greater amount of pressure, applying a limited amount of pressure to the tread sole to produce an abnormal outward bulge in the sole between the lateral margins thereof, pressing the margins of the shank portion of the sole into close fitting relation to the upper of the shoe, and applying sufficient pressure to the tread sole to reduce the thickness of said shank member and to reduce the height of the bulge in the sole, thereby reducing any tendency of the sole margins to pull away from the upper.

3. That improvement in methods of making shoes having close shanks which consists in producing an abnormal outward bulge or fullness at the shank portion of the tread sole of a shoe, before the sole is stitched to the shoe, by the use beneath the tread sole of a member adapted to remain permanently in the shoe and capable of being materially reduced in thickness by pressure, attaching the tread sole to the shoe by lines of stitching located one at each lateral margin of the shank portion of the sole, and thereafter applying pressure to the sole to press the margins of the shank portion of the sole toward the upper of the shoe and also to reduce the thickness of said member and depress the bulge in the sole, thereby increasing the distance between said lines of stitching to eliminate any tendency of the sole margins to pull away from the upper.

4. That improvement in methods of making shoes having close shanks which includes applying to a lasted shoe a collapsible shank piece, laying an outsole over said member with a pressure sufficient properly to lay the sole but insufficient to collapse the shank piece, attaching the outsole permanently to the shoe by stitching, and then applying to the shank portion of the shoe pressure sufficient to collapse the shank piece and cause the shank portion of the outsole to be extended laterally to assist in obtaining a close relation between the sole and upper at the shank of the shoe.

5. That improvement in methods of making shoes having close shanks which includes applying to a lasted shoe a yielding non-resilient shank member to support the central portion of the shank of an outsole, laying the outsole with cement over said member with a pressure sufficient properly to lay the sole but insufficient to compress the shank member, attaching the outsole permanently to the shoe by stitching, and then applying to the shank portion of the shoe leveling pressure sufficient to compress the shank member thereby causing the shank portion of the outsole previously supported by the shank member to be extended laterally and to force the sole margin into close relation to the upper at the shank of the shoe.

6. That improvement in methods of making shoes having close shanks which includes applying to a lasted shoe a collapsible shank member capable of sustaining sole laying pressure and incapable of sustaining sole leveling pressure, laying the sole with cement over said member, attaching the sole to the shoe by stitching, applying to the shank portion of the shoe leveling pressure sufficient to collapse the shank member so that the shank portion of the sole is extended laterally to relieve tension on the outer portion of the sole, and applying pressure to the margin of the shank of the sole to obtain a permanent close relation between the sole and upper at the shank of the shoe.

7. That improvement in methods of making shoes having close shanks which consists in positioning upon the outside of the bottom of a shoe, before the tread sole has been laid thereon, a member adapted to remain permanently in the shoe and capable of being materially reduced in thickness by pressure, utilizing a sole-laying pad to lay an outsole upon the shoe and to co-operate with said device to produce an abnormal outward bulge or fullness between the marginal portions of the sole at the shank of the shoe, stitching the tread sole to the shoe, and thereafter leveling the tread sole and utilizing the pressure of the leveling means to press the margins of the shank portion of the tread sole toward the upper of the shoe and also to reduce the thickness of said member and depress the bulged portion of the tread sole, thereby eliminating any tendency of the sole margins subsequently to pull away from the upper.

8. That improvement in methods of making welt shoes which consists in inseaming a welt and an upper to the rib of an insole, laying upon the insole, inside of the sewing rib, a shank piece capable of being widened to a substantial extent by pressure, laying an outsole and stitching it to the welt, and subsequently applying pressure to the outsole to widen the shank piece to cause the latter to overlie and provide support for the inseamed portions of the shoe.

9. That improvement in methods of making shoes with close shanks which consists in producing an abnormal outward bulge in the tread sole of a shoe by the employment at the inner side of the sole of a collapsible shank piece adapted to retain its shape under a limited amount of pressure but capable of being collapsed and widened by a greater amount of pressure, stitching the outsole to the shoe, and thereafter pressing the lateral margins of the outsole into close fitting relation to the upper and applying pressure to the outsole to increase the width of the shank piece, causing it to overlie and afford support for the inseamed portions of the shoe and also to depress the bulge in the sole and thereby to eliminate any tendency of the sole margins subsequently to pull away from the upper.

10. That improvement in methods of making shoes having close fitting sole margins which consists in producing and temporarily supporting an abnormal bulge in a shoe sole, and thereafter, by the application of pressure to the sole and to the bulge-supporting means, pressing the sole margins into close fitting relation to the shoe upper and rendering the bulge-supporting means ineffective to support the bulge, at the same time depressing the bulge thereby expanding the sole edgewise to eliminate any tendency of the sole margins subsequently to pull away from the upper.

11. That improvement in methods of making shoes having close fitting sole margins which consists in producing a bulge in a shoe sole, supporting said bulge in a manner to resist an amount of pressure greater than the first of two operations subsequently to be performed upon the sole in the process of completing the shoe but less than the second of said operations, and thereafter, during the performance of said second operation and while the sole is free to expand edgewise, pressing the sole margins into close fitting relation to the shoe upper and depressing said bulge, thereby expanding the sole edgewise to eliminate any tendency of the sole margins subsequently to pull away from the shoe upper.

12. That improvement in methods of making shoes having close fitting sole margins which consists in producing an outward bulge in a shoe sole and supporting said bulge by a collapsible member adapted to resist pressure of any operation upon the sole prior to leveling, and thereafter leveling the sole of the shoe and thereby pressing the sole margins into close fitting relation to the upper and collapsing said member and at the same time depressing said bulge and widening the sole to eliminate any tendency of the sole margins to pull away from the upper after the leveling pressure has been relieved.

13. A shank piece of substantial thickness adapted temporarily to support an abnormal outward bulge in the shank portion of the tread sole of a shoe and comprising a non-resilient member capable of being sufficiently reduced in thickness by the application of pressure to the bulged portion of the tread sole to permit elimination of the bulge.

14. A shank piece comprising a stiffener strip, and a non-resilient member secured to the stiffener strip and adapted temporarily to support a substantial outward bulge in the shank portion of the tread sole of a shoe and capable of being sufficiently reduced in thickness by the application of pressure to the bulged portion of the tread sole to permit elimination of the bulge.

15. A composite shank piece comprising an expanded strip of untempered metal adapted to be collapsed by the application of pressure thereto, and a stiffener strip of tempered metal secured to said expanded strip, said stiffener strip being longitudinally curved to provide support for the longitudinal arch of the shank portion of a shoe.

16. For use in the manufacture of shoes, a collapsible shank piece comprising members initially spaced apart and comprising a non-resilient member adapted to be permanently repositioned in closer relation to the other member upon application of a predetermined amount of pressure applied during the manufacture of a shoe in which the shank stiffener is incorporated.

17. For use in the manufacture of shoes having inner and outer soles, a collapsible shank stiffener comprising an insole engaging member, an outsole engaging member, and means located between the said members normally operative to maintain their intermarginal portions in spaced relation but capable of collapsing under pressure to diminish the space between said members.

18. A collapsible shank piece comprising a longitudinally arched strip having a portion offset from the curve of the arch to hold the body portion of the strip initially spaced a substantial distance from the insole of a shoe in which the shank piece is to be incorporated, said offset portion being non-resilient and constructed and arranged to yield under the application of a predetermined amount of pressure applied during the manufacture of the shoe to enable the body portion of the strip to be pressed into and permanently to retain a position closer to the insole of the shoe.

19. A collapsible shank piece comprising a longitudinally arched strip of non-resilient material having its opposite end portions offset to space the body portion of the strip initially away from the insole of a shoe in which the shank piece is to be incorporated, the offset end portions being adapted to yield under the application of a predetermined amount of pressure applied during the manufacture of the shoe to permit the body portion of the strip to approach more closely the insole of the shoe.

20. A collapsible shank piece comprising a stiffener member, and an initially expanded member capable of collapsing under pressure applied during the manufacture of a shoe in which the shank piece is incorporated, said expanded member being transversely arched and initially arranged with its lateral edge portions bearing against said stiffener member.

21. A collapsible shank piece comprising a longitudinally arched strip having a series of fingers spaced apart lengthwise of the strip and offset from the longitudinally convex side of the strip for holding the strip initially spaced from the insole of a shoe, said fingers being collapsible under pressure to enable the said strip to approach more closely to the insole.

22. A collapsible shank piece comprising a longitudinally arched strip having a series of fingers projecting from the opposite lateral edges of the strip, the fingers being offset from the strip to hold the strip spaced away from the insole of a shoe in which the shank piece is incorporated but being capable of flattening out under pressure to permit collapse of the shank piece.

23. A collapsible shank piece comprising a longitudinally arched strip having a series of fingers projecting beyond each lateral edge of the strip for holding the strip initially spaced from the insole of a shoe in which the insole is incorporated, the strip being transversely arched and said fingers being curved to continue the curvature of the transverse arch of the strip.

24. A collapsible shank piece comprising a longitudinally arched strip having a series of fingers projecting beyond each lateral edge of the strip for holding the strip initially spaced from the insole of a shoe in which the insole is incorporated, the strip being transversely arched and said fingers being curved to continue the curvature of the transverse arch of the strip and having the free extremities bent backwardly to facilitate spreading of the fingers upon collapse of the shank piece.

25. A collapsible shank piece of composite construction comprising a longitudinally arched stiffener strip, and a second longitudinally arched strip having non-resilient end portions secured to the stiffener strip, said end portions being offset from the curve of the body portion of the second strip to hold the latter away from the stiffener strip, and being capable of yielding to permit the body portion of the second strip to be moved into engagement with the first strip.

26. A collapsible shank piece of composite construction comprising a longitudinally arched stiffener strip, a second longitudinally arched strip of untempered metal having end portions offset from the curve of the body portion of the second strip for holding the latter away from the stiffener strip, said end portions being capable of yielding to enable the shank piece to collapse, and means for securing said end portions to the stiffener strip, said means being constructed and arranged to permit relative lengthwise movement of said strips to facilitate collapse of the shank piece.

27. A collapsible shank piece of composite construction comprising a longitudinally arched stiffener strip, a second longitudinally arched strip of non-resilient material having end portions offset from the curve of the body portion of the second strip for holding the latter away from the stiffener strip, said end portions being capable of yielding to enable the shank piece to collapse, means for fixedly securing one of said end portions to the stiffener strip, and means providing a pin-and-slot connection between the other of said end portions and the stiffener strip adapted to permit lengthwise movement of the second strip relatively to the stiffener strip upon collapse of the shank piece.

28. A collapsible shank piece of composite construction comprising a longitudinally arched stiffener strip, a second strip arched to correspond to the arch of the first strip, and non-resilient means for holding said strips initially in spaced relation, said means being yieldable to permit collapse of the shank piece.

29. A collapsible shank piece comprising a longitudinally arched strip, a second strip curved to correspond to the arch of the first strip, and means on the second strip arranged to engage the first strip and to hold the second strip spaced a substantial distance therefrom until the application of an excessive amount of pressure to the second strip.

30. A collapsible shank piece comprising a longitudinally arched strip, a second strip curved to correspond to the arch of the first strip and having offset end portions for holding the second strip in spaced relation to the first strip and thus maintaining the shank piece in expanded condition, and means for securing said end portions to the first strip constructed and arranged to permit relative longitudinal movement of the strips to facilitate collapse of the shank piece.

31. A collapsible shank piece comprising a filler piece, a stiffener strip secured to one side of the filler piece, and a collapsible member secured to the other side of the filler piece and having yieldable means thereon for initially holding said member spaced from the filler piece and thus maintaining the shank piece in expanded condition.

32. A collapsible shank piece comprising a filler piece having a marginal contour shaped to correspond to that of the inseamed portions at the shank of a shoe, a collapsible member secured to one side of the filler piece, and a plurality of fingers on the collapsible member offset toward the filler piece and engaging the latter to hold said members initially spaced therefrom and thus to maintain the shank piece initially in expanded condition.

33. A collapsible shank piece comprising a filler piece having a marginal contour shaped to correspond to that of the inseamed portions at the shank of a shoe, a collapsible member having offset end portions secured to the filler piece constructed and arranged to support the collapsible member in spaced relation to the filler piece, and a plurality of fingers projecting from the opposite lateral edges of the collapsible member and offset to engage the filler piece and assist in maintaining spaced relation between the filler piece and the collapsible member.

34. A collapsible shank piece comprising a filler piece having a marginal contour shaped to correspond to that of the inseamed portions at the shank of a shoe, a collapsible member having offset end portions secured to the filler piece constructed and arranged to support the collapsible member in spaced relation to the filler piece, and a plurality of fingers projecting from the opposite lateral edges of the collapsible member and offset to engage the filler piece and assist in maintaining spaced relation between the filler piece and the collapsible member, said collapsible member being transversely curved and said fingers being curved to continue the curve of the transverse arch of the collapsible member.

35. A collapsible shank piece comprising a filler piece having a marginal contour shaped to correspond to that of the inseamed portions at the shank of a shoe, a collapsible member having offset end portions secured to the filler piece and constructed and arranged to support the collapsible member in spaced relation to the filler piece, and a plurality of fingers projecting from the opposite lateral edges of the collapsible member and offset to engage the filler piece and assist in maintaining spaced relation between the filler piece and the collapsible member, said fingers being of different lengths and arranged to engage points on the filler piece spaced equal distances from the margin thereof.

36. A collapsible shank piece comprising a filler piece having a marginal contour shaped to correspond to that of the inseamed portions at the shank of a shoe, a collapsible member having offset end portions secured to the filler piece and constructed and arranged to support the collapsible member in spaced relation to the filler piece, and a plurality of fingers projecting from the opposite lateral edges of the collapsible member and offset to engage the filler piece and assist in maintaining spaced relation between the filler piece and the collapsible member, said fingers being of different lengths and arranged to engage points on the filler piece spaced equal distances from the margin thereof and the ends of said fingers being curved backwardly from the filler piece to facilitate sliding of said fingers over the surface of the filler piece during the collapsing of the shank piece.

37. In a welt shoe having a closed welt crease at the shank portion of the shoe, a shank piece constructed and arranged to fill the space between the inner and outer soles inside of the sewing rib of the insole and having means overlapping the inseamed portion at both sides of the shoe for supporting said portions of the shoe and thereby assisting in keeping the welt crease closed.

38. That improvement in methods of making shoes having close fitting sole margins which consists in assembling an upper, a tread sole and a shank stiffening member and utilizing the latter to produce an abnormal outward bulge in said sole so as temporarily to decrease the width of the shank portion of the sole, securing the tread sole to the upper, and thereafter pressing marginal portions of the sole into close fitting relation to the upper, rendering said member ineffective to support said bulge while still remaining effective to stiffen the shank portion of the sole, and depressing the bulge in the sole to widen the sole and thus to reduce any tendency of the sole margins to pull away from the upper after the pressure against the sole margins has been relieved.

39. That improvement in methods of making shoes having close fitting sole margins which consists in producing a bulge in a shoe sole, supporting the bulge in a manner to resist the pressure of any operation upon the sole prior to leveling, and thereafter leveling the sole of the shoe and thereby compressing the sole margins into close fitting relation to the upper and depressing the bulge to widen the sole and eliminate any tendency of the sole margins to pull away from the upper after the leveling pressure has been relieved.

JOHN B. HADAWAY.